US012203251B1

(12) United States Patent
Lin

(10) Patent No.: US 12,203,251 B1
(45) Date of Patent: Jan. 21, 2025

(54) MODULAR SHOWER HEAD SYSTEM

(71) Applicant: Nelson Lin, New York, NY (US)

(72) Inventor: Nelson Lin, New York, NY (US)

( * ) Notice: Subject to any disclaimer, the term of this patent is extended or adjusted under 35 U.S.C. 154(b) by 71 days.

(21) Appl. No.: 17/898,561

(22) Filed: Aug. 30, 2022

(51) Int. Cl.
*E03C 1/04* (2006.01)
*B05B 1/18* (2006.01)

(52) U.S. Cl.
CPC .............. *E03C 1/0408* (2013.01); *B05B 1/18* (2013.01)

(58) Field of Classification Search
CPC ................................ E03C 1/0408; B05B 1/18
USPC ............................................................ 4/601
See application file for complete search history.

(56) References Cited

U.S. PATENT DOCUMENTS 1,354,838 A * 10/1920 Perkins .................... A47K 3/28 239/587.5
3,913,839 A 10/1975 Wilson
3,971,074 A * 7/1976 Yxfeldt .................. A47K 3/287 4/612
5,428,850 A 7/1995 Hiraishi
6,227,456 B1 * 5/2001 Colman .................... E03C 1/06 239/536
D445,478 S 7/2001 Reeves
6,550,080 B1 * 4/2003 Grewal .................. A47K 3/281 4/662
7,987,533 B2 * 8/2011 Phipps .................. E03C 1/0408 4/596
8,191,185 B2 * 6/2012 Tsai .......................... E03C 1/06 4/615
8,911,100 B2 9/2014 Tsai
2004/0133973 A1 * 7/2004 Rosenberg ............... A47K 3/28 4/601
2006/0207012 A1 * 9/2006 DeBoer ................. E03C 1/0408 4/601
2006/0218720 A1 * 10/2006 Thompson ............ E03C 1/0408 4/601
2006/0236451 A1 * 10/2006 Freedmann ............... E03C 1/06 4/601
2007/0033729 A1 2/2007 Faux
2009/0094737 A1 4/2009 Tracey
2011/0216526 A1 9/2011 Li
2012/0091923 A1 * 4/2012 Kastner-Jung ...... F21V 33/0016 313/512
2015/0089734 A1 * 4/2015 Berngard ................ E03C 1/066 4/601
2016/0000273 A1 * 1/2016 Shah ...................... A61H 33/08 4/601
2016/0060852 A1 * 3/2016 Rexach ..................... B05B 1/18 137/359
2016/0288142 A1 * 10/2016 Johnson .................. E03B 1/044
(Continued)

*Primary Examiner* — Erin Deery
*Assistant Examiner* — William R Klotz

(57) ABSTRACT

The modular shower head system comprises three or more shower heads, a plumbing manifold, a plurality of diverter valves, and a plurality of in-shower light fixtures. The modular shower head system may be installed within a shower stall. The three or more shower heads may comprise a rainfall shower head, at least one misting shower head, and at least one handheld shower head. The plumbing manifold may direct water from an existing shower nipple emerging from a wall of the shower stall to the three or more shower heads. The plurality of diverter valves, in conjunction with one or more shower water flow controls on the wall of the shower stall, may control the flow of the water to the three or more shower heads.

12 Claims, 4 Drawing Sheets

(56) References Cited

U.S. PATENT DOCUMENTS

| | | | | |
|---|---|---|---|---|
| 2021/0016301 | A1* | 1/2021 | Cipriani | B05B 15/62 |
| 2021/0262208 | A1* | 8/2021 | Garcia | E03C 1/025 |

* cited by examiner

MODULAR SHOWER HEAD SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bathroom shower systems, more specifically, a modular shower head system.

SUMMARY OF INVENTION

The modular shower head system comprises three or more shower heads, a plumbing manifold, a plurality of diverter valves, and a plurality of in-shower light fixtures. The modular shower head system may be installed within a shower stall. The three or more shower heads may comprise a rainfall shower head, at least one misting shower head, and at least one handheld shower head. The plumbing manifold may direct water from an existing shower nipple emerging from a wall of the shower stall to the three or more shower heads. The plurality of diverter valves, in conjunction with one or more shower water flow controls on the wall of the shower stall, may control the flow of the water to the three or more shower heads.

An object of the invention is to provide three or more shower heads and a plumbing manifold for spraying water onto a user.

Another object of the invention is to provide a rainfall shower head, at least one misting shower head, and at least one handled shower head.

A further object of the invention is to provide a two groups of shower heads, each controlled by a diverter valve.

Yet another object of the invention is to provide a plurality of in-shower light fixtures and a plurality of rainfall lights for establishing a mood.

These together with additional objects, features and advantages of the modular shower head system will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular shower head system in detail, it is to be understood that the modular shower head system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular shower head system.

It is therefore important that the claims be regarded as including such equivalent construction insofar as they do not depart from the spirit and scope of the modular shower head system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
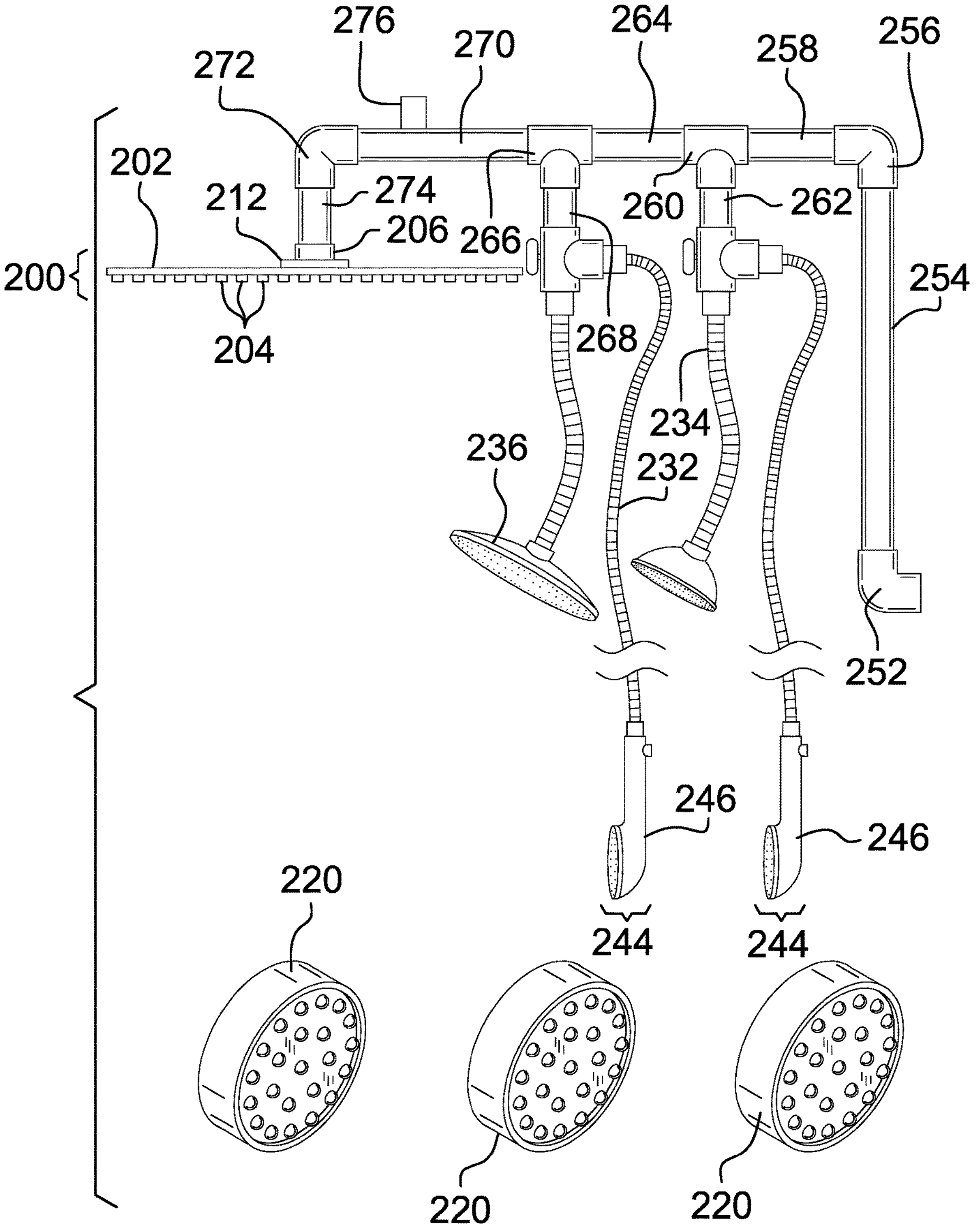
FIG. 1 is a side view of an embodiment of the disclosure.
Figure 2:
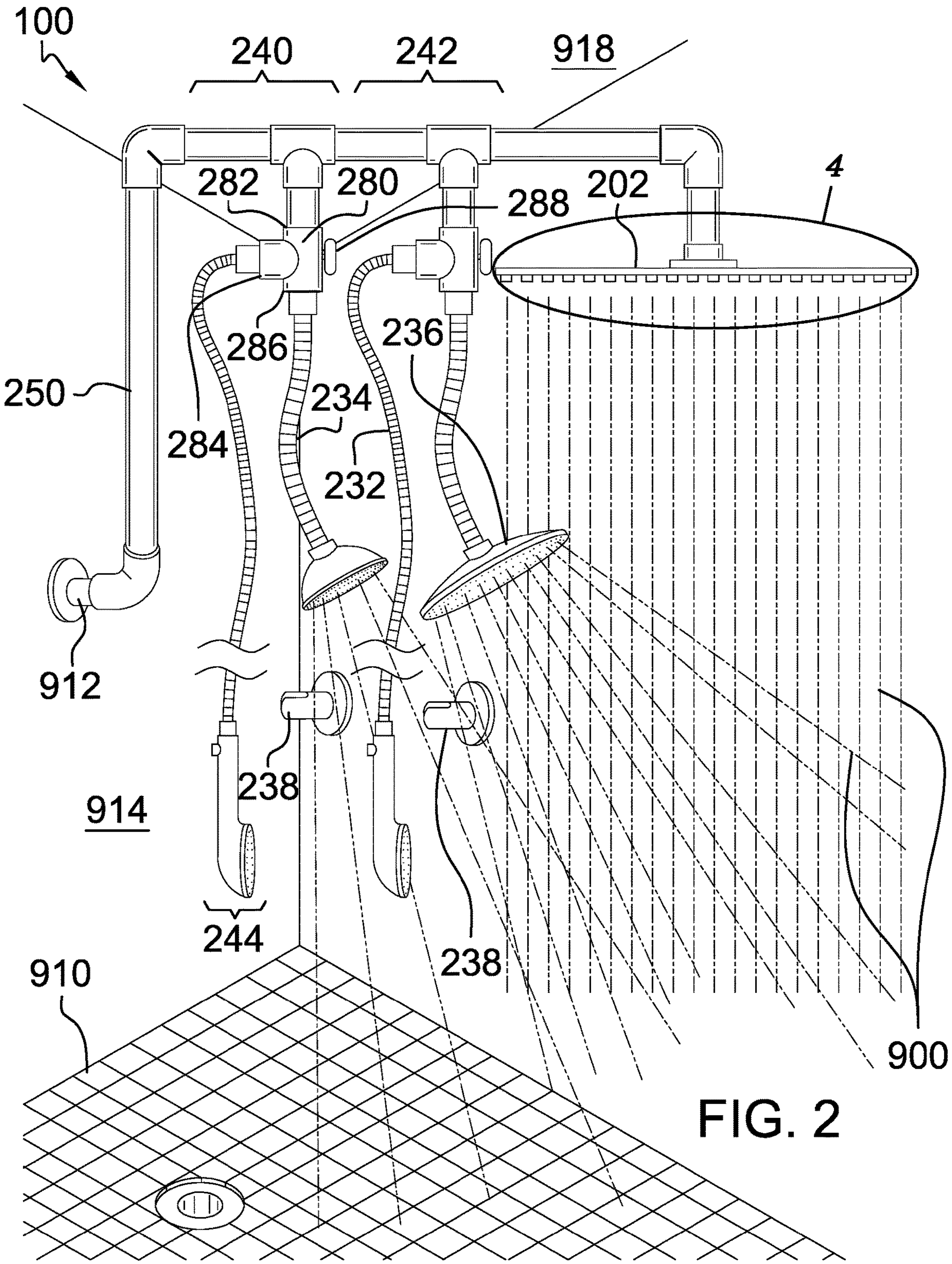
FIG. 2 is an-in-use view of an embodiment of the disclosure.
Figure 3:
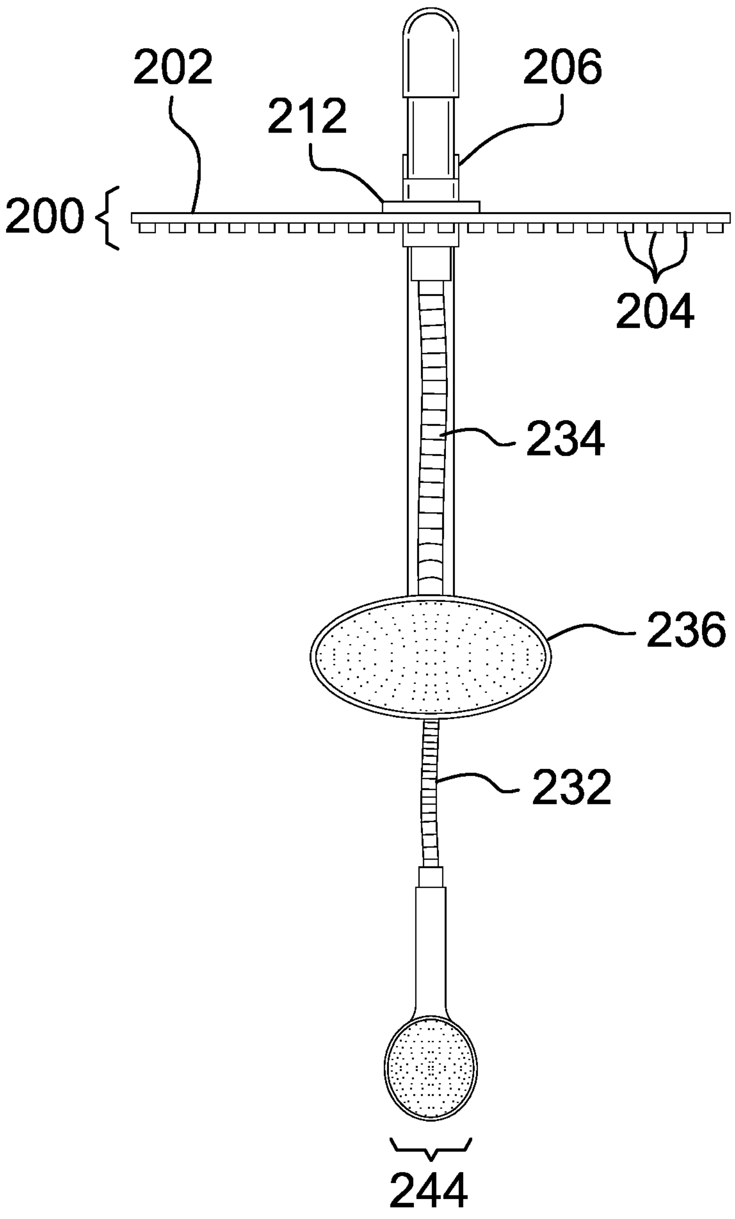
FIG. 3 is a front view of an embodiment of the disclosure.
Figure 4:
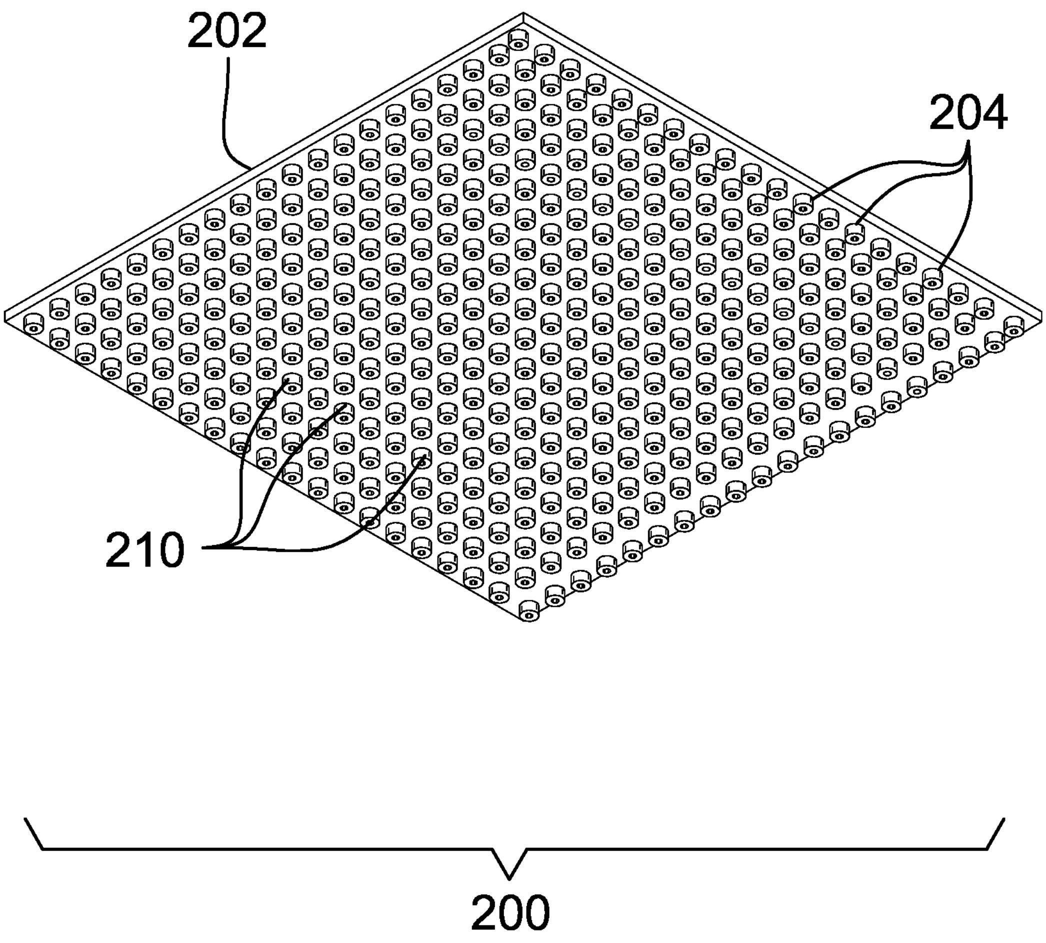
FIG. 4 is a detail view of an embodiment of the disclosure illustrating the bottom surface of the rainfall shower head.

Detailed reference will now be made to a first potential embodiment of the disclosure, which is illustrated in FIGS. 1 through 4.

The modular shower head system 100 (hereinafter invention) comprises three or more shower heads, a plumbing manifold 250, a plurality of diverter valves, and a plurality of in-shower light fixtures 220. The invention 100 may be installed within a shower stall 910. The three or more shower heads may comprise a rainfall shower head 200, at least one misting shower head 236, and at least one handheld shower head 244. The plumbing manifold 250 may direct water 900 from an existing shower nipple 912 emerging from a wall 914 of the shower stall 910 to the three or more shower heads. The plurality of diverter valves, in conjunction with one or more shower water flow controls on the wall 914 of the shower stall 910, may control the flow of the water 900 to the three or more shower heads. The three or more shower heads may be adapted to direct the water 900 towards a user. As a non-limiting example, the invention 100 may retrofit an existing shower head.

The rainfall shower head 200 may comprise a rainfall shower head body 202 that may be horizontally-oriented and may have a surface area of a last 25 square inches. The rainfall shower head body 202 may be hollow. The water 900 entering the rainfall shower head body 202 via a rainfall inflow coupler 206 located on the top surface of the rainfall shower head body 202 may be dispersed through a plurality of rainfall nozzles 204 located on the bottom surface of the rainfall shower head body 202. The rainfall shower head 200 may be adapted to simulate rain falling on the user.

The rainfall shower head 200 may comprise a plurality of rainfall lights 210 that may be positioned at a subset of the plurality of rainfall nozzles 204. The plurality of rainfall lights 210 may be self-powered by an internal generator 212 driven by the flow of the water 900 and may not require an external electrical connection.

The at least one misting shower head 236 may be adapted to disperse the water 900 as a mist comprising water droplets. The at least one misting shower head 236 may reduce water consumption by limiting the volume of the water 900 that may flow through the at least one misting shower head 236 within a measured time interval as compared to the volume of the water 900 flowing through a non-misting shower head during the same measured time interval.

As a non-limiting example, the at least one misting shower head 236 may be coupled, directly or indirectly, to the plumbing manifold 250 via a gooseneck arm hose 234.

The at least one handheld shower head 244 may disperse the water 900 from a shower head 246 that may be adapted to be held and repositioned by the user. The at least one handheld shower head 244 may be coupled, directly or indirectly, to the plumbing manifold 250 via a flexible shower hose 232. The shower head 246 may be retained by a clip located on one of the plurality of diverter valves and may be used while clipped. The shower head 246 may be detached from the clip and may be repositioned during use while not clipped.

The three or more shower heads may be grouped. A first group of shower heads 240 may be fluidly coupled to one of the plurality of diverter valves and a second group of shower heads 242 may be fluidly coupled to a different one of the plurality of diverter valves. As a non-limiting example, the first group of shower heads 240, the second group of shower heads 242, or both may comprise the at least one misting shower head 236 and the at least one handheld shower head 244.

In a preferred embodiment, the three or more shower heads may comprise five shower heads. The five shower heads may comprise the rainfall shower head 200, two shower heads in the first group of shower heads 240, and two shower heads in the second group of shower heads 242.

As a non-limiting example, the three or more shower heads or any combination thereof may comprise an adjustable tilt. The adjustable tilt may permit the orientation angle of the shower head 246 to be changed in up to two dimensions.

The plumbing manifold 250 may comprise a bottom elbow coupler 252, a vertical pipe section 254, a first upper elbow coupler 256, a first horizontal pipe section 258, a first tee coupler 260, a first down nipple 262, a second horizontal pipe section 264, a second tee coupler 266, a second down nipple 268, a third horizontal pipe section 270, a second upper elbow coupler 272, and a third down nipple 274. The plumbing manifold 250 may distribute the water 900 from the existing shower nipple 912 to the three or more shower heads. The water 900 may enter the plumbing manifold 250 when the one or more shower water flow controls located on the wall 914 of the shower stall 910 are adjusted to permit the flow of the water 900. The one or more shower water flow controls may also be adapted to adjust the temperature of the water 900.

The bottom elbow coupler 252 may direct the flow of the water 900 up through the vertical pipe section 254 along the wall 914 of the shower stall 910. One end of the bottom elbow coupler 252 may couple to the existing shower nipple 912. The other end of the bottom elbow coupler 252 may be coupled to the bottom of the vertical pipe section 254. The top of the vertical pipe section 254 may be coupled to the first upper elbow coupler 256 which may redirect the water 900 away from the wall 914 of the shower stall 910. The first upper elbow coupler 256 may be coupled to one end of the first horizontal pipe section 258. The other end of the first horizontal pipe section 258 may be coupled to the first tee coupler 260. The first down nipple 262 may be coupled to the first tee coupler 260 and may be oriented to project downward from the first tee coupler 260. The first group of shower heads 240 may be coupled to the bottom of the first down nipple 262.

One end of the second horizontal pipe section 264 may be coupled to the first tee coupler 260 such that the second horizontal pipe section 264 is colinear with the first horizontal pipe section 258 and located on the opposite side of the first tee coupler 260 from the first horizontal pipe section 258. The other end of the second horizontal pipe section 264 may be coupled to the second tee coupler 266. The second down nipple 268 may be coupled to the second tee coupler 266 and may be oriented to project downward from the second tee coupler 266. The second group of shower heads 242 may be coupled to the bottom of the second down nipple 268.

One end of the third horizontal pipe section 270 may be coupled to the second tee coupler 266 such that the third horizontal pipe section 270 is colinear with the second horizontal pipe section 264 and located on the opposite side of the second tee coupler 266 from the second horizontal pipe section 264. The other end of the third horizontal pipe section 270 may be coupled to the second upper elbow coupler 272. The third down nipple 274 may be coupled to the second upper elbow coupler 272 and may be oriented to project downward from the second upper elbow coupler 272. The rainfall shower head 200 may be coupled to the bottom of the third down nipple 274.

The plurality of diverter valves may control the flow of the water 900 to the first group of shower heads 240 and to the second group of shower heads 242. An individual diverter valve 280 selected from the plurality of diverter valves may comprise a valve inflow coupler 282, a first valve outflow coupler 284, a second valve outflow coupler 286, and a valve handle 288. The water 900 may enter the individual diverter valve 280 from the plumbing manifold 250 via the valve inflow coupler 282. A valve core located within the individual diverter valve 280 may be repositioned by the valve handle 288 such that the valve core may prevent the water 900 from passing through the individual diverter valve 280 or may direct the water 900 to the first valve outflow coupler 284, the second valve outflow coupler 286, or both. The individual diverter valve 280 may prevent the water 900 from exiting the individual diverter valve 280 if the valve handle 288 is turned to a valve off position. The water 900 may exit the individual diverter valve 280 via the first valve outflow coupler 284, the second valve outflow coupler 286, or both as the valve handle 288 is turned away from the valve off position.

The plurality of in-shower light fixtures 220 may be battery-operated LED lighting units that may be detachably coupled to the walls 914 of the shower stall 910. The plurality of in-shower light fixtures 220, in conjunction with the plurality of rainfall lights 210, may be adapted to establish a mood for the user while the invention 100 is in use. As a non-limiting example, the colors, intensities, and patterns displayed by the plurality of in-shower light fixtures 220 and the plurality of rainfall lights 210 may promote relaxation.

In some embodiments, the plumbing manifold 250 may further comprise a ceiling mount 276 that may be operable to suspend the plumbing manifold 250 from a shower ceiling 918. The ceiling mount 276 may be coupled to the shower ceiling 918 and to the plumbing manifold 250 at a location above the rainfall shower head 200 such that the shower ceiling 918 supports a portion of the weight of the invention 100 via the ceiling mount 276.

In some embodiments, the invention 100 may comprise one or more suction cup shower head holders 238 that may be detachably coupled to the walls 914 of the shower stall 910. The one or more suction cup shower head holders 238 may be operable as alternative locations for holding the shower head 246 of the at least one handheld shower head 244 when the at least one handheld shower head 244 is not clipped to one of the plurality of diverter valves.

In use, the plumbing manifold 250 may be coupled to the existing shower nipple 912 and suspended from the shower ceiling 918 by the ceiling mount 276. The water 900 may be turned on at the one or more shower water flow controls located on the wall 914 of the shower stall 910, at the plurality of diverter valves, or combinations thereof. The plurality of in-shower light fixtures 220 and/or the plurality of rainfall lights 210 may be used to establish a mood for the user. The user may adjust the combination of which of the three or more shower heads are turned on and the flow rate of the water 900 as desired.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

As used herein, the words “couple”, “couples”, “coupled” or “coupling”, may refer to connecting, either directly or indirectly, and does not necessarily imply a mechanical connection.

As used herein, the word “desired” may refer to a specific value or action within a range of supported values or action. A “desired” value or action may indicate that a range of values or actions is enabled by the invention and that a user of the invention may select a specific value or action within the supported range of values or actions based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, “flexible” may refer to an object or material which will deform when a force is applied to it, which will not return to its original shape when the deforming force is removed, and which may not retain the deformed shape caused by the deforming force.

In this disclosure, a “generator” may refer to a device that converts rotational mechanical energy into electric energy.

As used herein, “gooseneck” may refer to a hose or tubing that will bend and retain the shape of the bend after the bending force is removed. Goosenecks are often used on lamps and microphone stands to allow an orientation of the lamp or microphone be set and held.

As used herein, “handle” may refer to an object by which a tool, object, or door is held or manipulated with the hand.

As used in this disclosure, “horizontal” may be a directional term that refers to a direction that is perpendicular to the local force of gravity. Unless specifically noted in this disclosure, the horizontal direction is always perpendicular to the vertical direction.

As used in this disclosure, an “LED” may be an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used in this disclosure, a “manifold” may be a pipe or chamber having several ports through which liquid or gas is gathered or distributed.

As used herein, “misting shower head” may refer to a shower head that atomizes the water. The misting shower head may spray a mist of very fine droplets of water and may conserve water by reducing the water flow in comparison to a non-misting shower head.

As used in this disclosure, “orientation” may refer to the positioning and/or angular alignment of a first object relative to a second object or relative to a reference position or reference direction.

As used herein, “rainfall shower” (also known as a rain-type shower, rain shower, or a waterfall shower) may refer to a shower that utilizes a horizontally-oriented flat shower head to simulate falling rain. Rain-type shower heads usually cover a larger surface area than conventional shower heads. As a non-limiting example, a conventional shower head may have a surface area of less than 55 sq in whereas a rain-type shower head may have a surface area of 25 sq in or more. Conventional shower heads may dispose a plurality of pressurized spray nozzles over a curved shower head face whereas a rain-type shower head may dispose a larger number of low pressure spray nozzles over a flat shower head face. Rain-type shower heads may be mounted on a ceiling of the shower such that the rain-type shower head is above the user.

As used herein, “shower hose” may refer to a flexible plumbing conduit that may couple a shower head to a shower arm or other water source. A shower hose may comprise a watertight, flexible inner tube surrounded by a semi-rigid metal outer sleeve. A threaded nut and rubber washers at each end of the shower hose may couple the shower hose to other plumbing fixtures such that water does not leak from the shower hose of the couplings.

As used herein, "showerhead" or "shower head" may refer to a perforated nozzle for dispersing water in a shower.

As used in this disclosure, a "suction cup" may refer to an object or device that uses negative fluid pressure of air or water to adhere to non-porous surfaces by creating a partial vacuum.

As used in this disclosure, a "valve" may be a device that is used to control the flow of a fluid, either gas or liquid, through a pipe or to control the flow of a fluid into and out of a container. Some valves may have multiple ports and may allow the diverting or mixing of fluids.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A modular shower head system comprising:

three or more shower heads, a plumbing manifold, a plurality of diverter valves, and a plurality of in-shower light fixtures;

wherein the modular shower head system is installed within a shower stall;

wherein the three or more shower heads comprise a rainfall shower head, at least one misting shower head, and at least one handheld shower head;

wherein the plumbing manifold directs water from an existing shower nipple emerging from a wall of the shower stall to the three or more shower heads;

wherein the plurality of diverter valves, in conjunction with one or more shower water flow controls on the wall of the shower stall, control a flow of the water to the three or more shower heads;

wherein the at least one handheld shower head disperses the water from a shower head that is adapted to be held and repositioned by the user;

wherein the at least one handheld shower head is coupled, directly or indirectly, to the plumbing manifold via a flexible shower hose;

wherein the plurality of in-shower light fixtures are battery-operated LED lighting units that are detachably coupled to walls of the shower stall;

wherein the plurality of in-shower light fixtures, in conjunction with a plurality of rainfall lights, are adapted to establish a mood for the user while the modular shower head system is in use;

wherein the rainfall shower head comprises a rainfall shower head body that is horizontally-oriented;

wherein the at least one misting shower head is adapted to disperse the water as a mist comprising water droplets;

wherein the at least one misting shower head reduces water consumption by limiting a volume of the water that flows through the at least one misting shower head within a measured time interval;

wherein the three or more shower heads are grouped;

wherein a first group of shower heads is fluidly coupled to one of the plurality of diverter valves and a second group of shower heads is fluidly coupled to a different one of the plurality of diverter valves;

wherein the rainfall shower head body is hollow;

wherein the water entering the rainfall shower head body via a rainfall inflow coupler located on a top surface of the rainfall shower head body is dispersed through a plurality of rainfall nozzles located on a bottom surface of the rainfall shower head body;

wherein the rainfall shower head is adapted to simulate rain falling on a user;

wherein the rainfall shower head comprises the plurality of rainfall lights that are positioned at a subset of the plurality of rainfall nozzles;

wherein the plurality of rainfall lights are self-powered by an internal generator driven by the flow of the water;

wherein the at least one misting shower head is coupled, directly or indirectly, to the plumbing manifold via a gooseneck arm hose;

wherein the at least one handheld shower head is retained by a clip located on one of the plurality of diverter valves and is usable while clipped;

wherein the at least one handheld shower head is detached from the clip and is repositionable during use while not clipped.

2. The modular shower head system according to claim 1 wherein the first group of shower heads, the second group of shower heads, or both comprise the at least one misting shower head and the at least one handheld shower head.

3. The modular shower head system according to claim 2 wherein the three or more shower heads comprise five shower heads;

wherein the five shower heads comprises the rainfall shower head, two shower heads in the first group of shower heads, and two shower heads in the second group of shower heads.

4. The modular shower head system according to claim 2 wherein the three or more shower heads or any combination thereof comprise an adjustable tilt;

wherein the adjustable tilt permits an orientation angle of the at least one handheld shower head to be changed in up to two dimensions.

5. The modular shower head system according to claim 4 wherein the plumbing manifold comprises a bottom elbow coupler, a vertical pipe section, a first upper elbow coupler, a first horizontal pipe section, a first tee coupler, a first down nipple, a second horizontal pipe section, a second tee coupler, a second down nipple, a third horizontal pipe section, a second upper elbow coupler, and a third down nipple;

wherein the plumbing manifold distributes the water from the existing shower nipple to the three or more shower heads.

6. The modular shower head system according to claim 5 wherein the water enters the plumbing manifold when the one or more shower water flow controls located on the wall of the shower stall are adjusted to permit the flow of the water.

7. The modular shower head system according to claim 6 wherein the bottom elbow coupler directs the flow of the water up through the vertical pipe section along the wall of the shower stall;

wherein one end of the bottom elbow coupler couples to the existing shower nipple;

wherein an other end of the bottom elbow coupler is coupled to a bottom of a vertical pipe section;

wherein the top of the vertical pipe section is coupled to the first upper elbow coupler;

wherein the first upper elbow coupler is coupled to one end of the first horizontal pipe section;

wherein an other end of the first horizontal pipe section is coupled to the first tee coupler;

wherein the first down nipple is coupled to the first tee coupler and is oriented to project downward from the first tee coupler;

wherein the first group of shower heads is coupled to a bottom of the first down nipple.

8. The modular shower head system according to claim 7 wherein one end of the second horizontal pipe section is coupled to the first tee coupler such that the second horizontal pipe section is colinear with the first horizontal pipe section and located on an opposite side of the first tee coupler from the first horizontal pipe section;

wherein an other end of the second horizontal pipe section is coupled to the second tee coupler;

wherein the second down nipple is coupled to the second tee coupler and is oriented to project downward from the second tee coupler;

wherein the second group of shower heads is coupled to a bottom of the second down nipple.

9. The modular shower head system according to claim 8 wherein one end of the third horizontal pipe section is coupled to the second tee coupler such that the third horizontal pipe section is colinear with the second horizontal pipe section and located on an opposite side of the second tee coupler from the second horizontal pipe section;

wherein an other end of the third horizontal pipe section is coupled to the second upper elbow coupler;

wherein the third down nipple is coupled to the second upper elbow coupler and is oriented to project downward from the second upper elbow coupler;

wherein the rainfall shower head is coupled to a bottom of the third down nipple.

10. The modular shower head system according to claim 9 wherein the plurality of diverter valves control the flow of the water to the first group of shower heads and to the second group of shower heads;

wherein an individual diverter valve selected from the plurality of diverter valves comprises a valve inflow coupler, a first valve outflow coupler, a second valve outflow coupler, and a valve handle;

wherein the water enters the individual diverter valve from the plumbing manifold via the valve inflow coupler;

wherein a valve core located within the individual diverter valve is repositioned by the valve handle such that the valve core prevents the water from passing through the individual diverter valve or directs the water to the first valve outflow coupler, the second valve outflow coupler, or both;

wherein the individual diverter valve prevents the water from exiting the individual diverter valve if the valve handle is turned to a valve off position;

wherein the water exits the individual diverter valve via the first valve outflow coupler, the second valve outflow coupler, or both as the valve handle is turned away from the valve off position.

11. The modular shower head system according to claim 10 wherein the plumbing manifold further comprises a ceiling mount that is operable to suspend the plumbing manifold from a shower ceiling;

wherein the ceiling mount is coupled to the shower ceiling and to the plumbing manifold at a location above the rainfall shower head such that the shower ceiling supports a portion of a weight of the modular shower head system via the ceiling mount.

12. The modular shower head system according to claim 10 wherein the modular shower head system comprises one or more suction cup shower head holders that are detachably coupled to walls of the shower stall;

wherein the one or more suction cup shower head holders are operable as alternative locations for holding the shower head of the at least one handheld shower head when the at least one handheld shower head is not clipped to one of the plurality of diverter valves.

* * * * *